US005572289A

United States Patent [19]

Cheng

[11] Patent Number: 5,572,289

[45] Date of Patent: Nov. 5, 1996

[54] IMAGE CONVERTING APPARATUS WITH DOCUMENT CONTACTING DEVICE CAPABLE OF ELIMINATING THIN-FILM INTERFERENCE AND METHOD FOR ELIMINATING THIN-FILM INTERFERENCE

[75] Inventor: Jyi-Fang Cheng, Taipei City, Taiwan

[73] Assignee: Teco Information Systems Co., Ltd., Taipei City, Taiwan

[21] Appl. No.: 490,814

[22] Filed: Jun. 15, 1995

[51] Int. Cl.[6] .................................................... G03B 27/62

[52] U.S. Cl. ............................................................ 355/75

[58] Field of Search ................................ 355/71, 75, 77, 355/230; 359/452, 453, 460

[56] References Cited

U.S. PATENT DOCUMENTS

| | | | |
|---|---|---|---|
| 3,655,263 | 4/1972 | Hoffman et al. | 359/453 |
| 3,998,541 | 12/1976 | Michaloski | 355/11 |
| 4,728,994 | 3/1988 | Spinelli et al. | 355/71 |

*Primary Examiner*—Arthur T. Grimley
*Assistant Examiner*—David A. Lane
*Attorney, Agent, or Firm*—Christie, Parker & Hale, LLP

[57] ABSTRACT

An image converting apparatus, such as an optical scanner, photocopier or an image projector, includes a document contacting device with a contact surface that is provided with a plurality of micro-particles which diffuse light to eliminate the effects of thin-film interference. The micro-particles on the contact surface have a distribution density greater than the resolution of the image converting apparatus.

10 Claims, 4 Drawing Sheets

IMAGE CONVERTING APPARATUS WITH DOCUMENT CONTACTING DEVICE CAPABLE OF ELIMINATING THIN-FILM INTERFERENCE AND METHOD FOR ELIMINATING THIN-FILM INTERFERENCE

BACKGROUND OF THE INVENTION

1. Field of the Invention

The invention relates to an image converting apparatus, more particularly to an image converting apparatus with a document contacting device that is capable of eliminating thin-film interference and to a method for eliminating thin-film interference in an image converting device.

2. Description of the Related Art

A conventional image converting apparatus, such as an optical scanner, photocopier or an image projector, has a document contacting device with a contact surface for contacting a document. The document contacting device is made of transparent glass when applied in an optical scanner or in a photocopier. In an image projector, the contact surface of the document contacting device is a reflective surface. The document may be a transparent projector film with an image thereon, a photograph or a sheet of paper. The optical scanner converts the image on a document into electrical signals for storage in a memory device or for display on a computer monitor. The photocopier converts the image on a document into an appropriate signal for duplicating the image on a sheet of paper. The image projector converts the image on a transparent projector film into a light image that can be displayed on a projector screen.

Usually, the resulting image generated by the image converting apparatus is not clear or has lost lines due to improper contact between the document and the document contacting device. It is noted that, in the conventional image converting apparatus, the contact surface of the document contacting device is a smooth and flat surface. Thus, when a document is made to contact the contact surface of the document contacting device, a thin layer of air is usually present between the document and the contact surface, thereby resulting in thin-film interference.

Thin-film interference is described in greater detail with reference to FIG. 1. As shown, when a light beam (a) passes through a thin layer 10 of air having a thickness (t) ranging from 150 nm to 1000 nm, two penetrating light beams (cd) and (cfhi) are generated. When the phase difference of the penetrating light beams, (cd) and (cfhi), is equal to half a wavelength or is an odd multiple of half the wavelength, an additive type of interference occurs. When the phase difference of the penetrating light beams, (cd) and (cfhi), is equal to an even multiple of half the wavelength, a subtractive type of interference occurs. In either case, a series of bright and dark bands, similar to Newton's rings, is generated. This is also true for the reflected light beams (be) and (bcfg).

SUMMARY OF THE INVENTION

Therefore, the object of the present invention is to provide an image converting apparatus with a document contacting device that is capable of eliminating thin-film interference.

Another object of the present invention is to provide a method for eliminating thin-film interference in an image converting apparatus.

According to one aspect of the present invention, an image converting apparatus, such as an optical scanner, a photocopier or an image projector, comprises a document contacting device with a contact surface that is provided with a plurality of micro-particles which have a light diffusing effect and a distribution density greater than resolution of the image converting apparatus.

According to another aspect of the present invention, a method for eliminating thin-film interference in an image converting apparatus, such as an optical scanner, a photocopier or an image projector, comprises the step of providing a contact surface of a document contacting device of the image converting apparatus with a plurality of micro-particles that have a light diffusing effect and a distribution density greater than resolution of the image converting apparatus.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
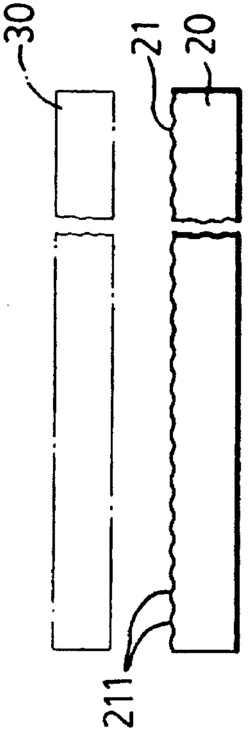
FIG. 2 is a side view of a document contacting device of the preferred embodiment of an image converting apparatus according to the present invention.
Figure 5:
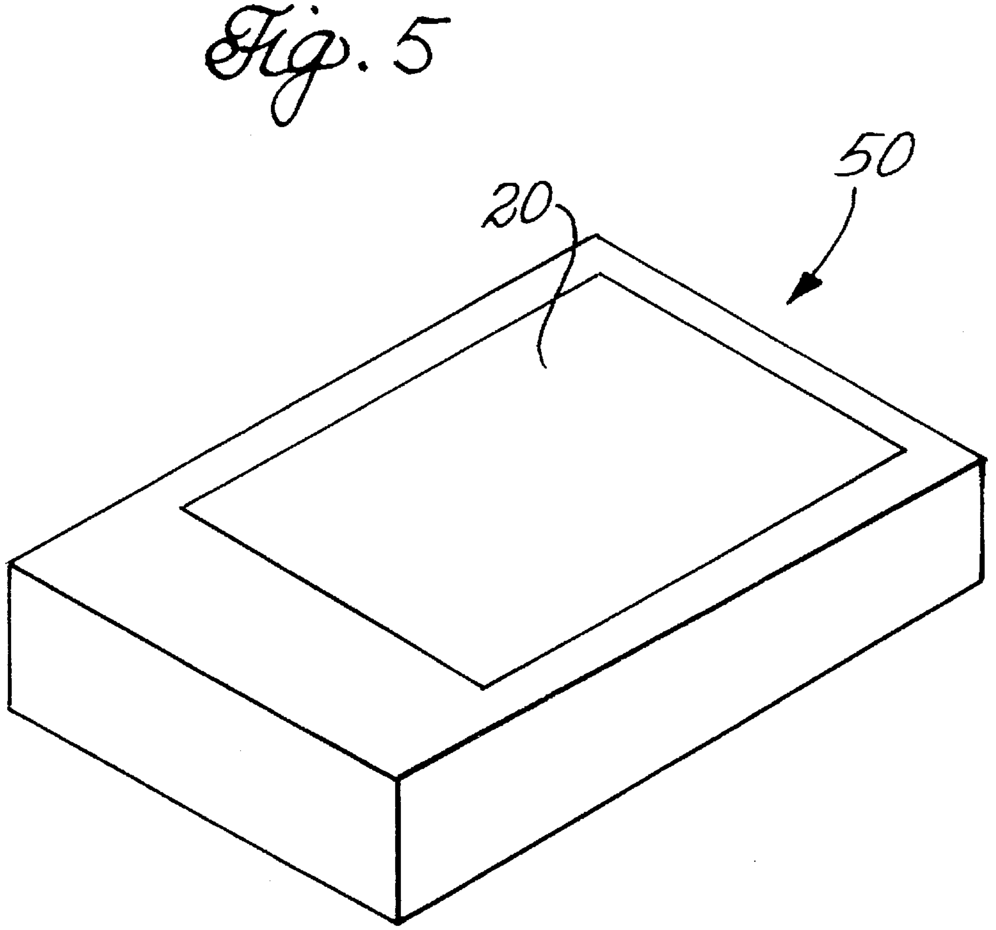
FIG. 5 is a perspective view of a first embodiment of an image converting apparatus comprising an optical scanner.
Figure 6:
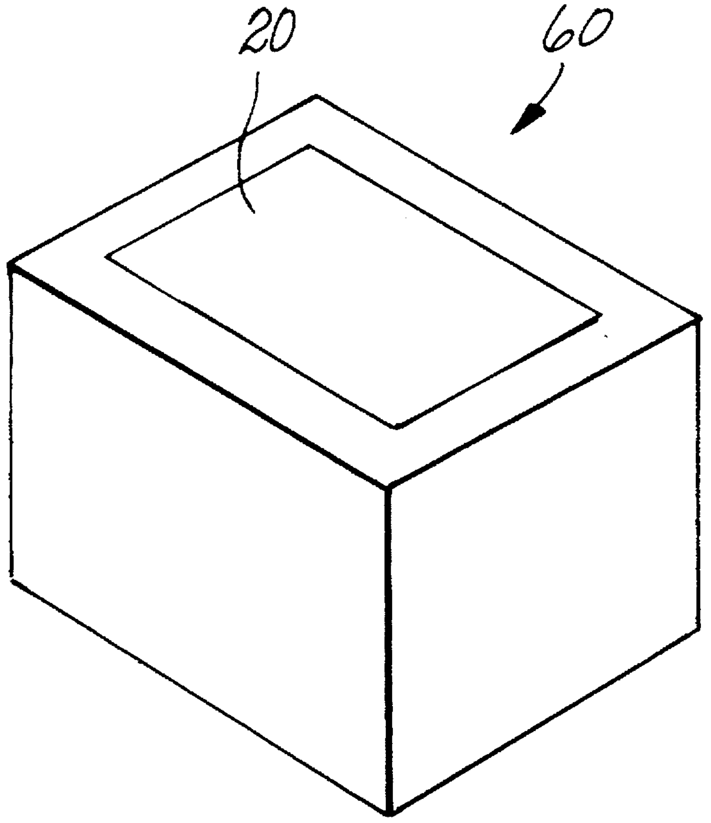
FIG. 6 is a prospective view of a second embodiment of an image converting apparatus comprising a photocopier.
Figure 7:
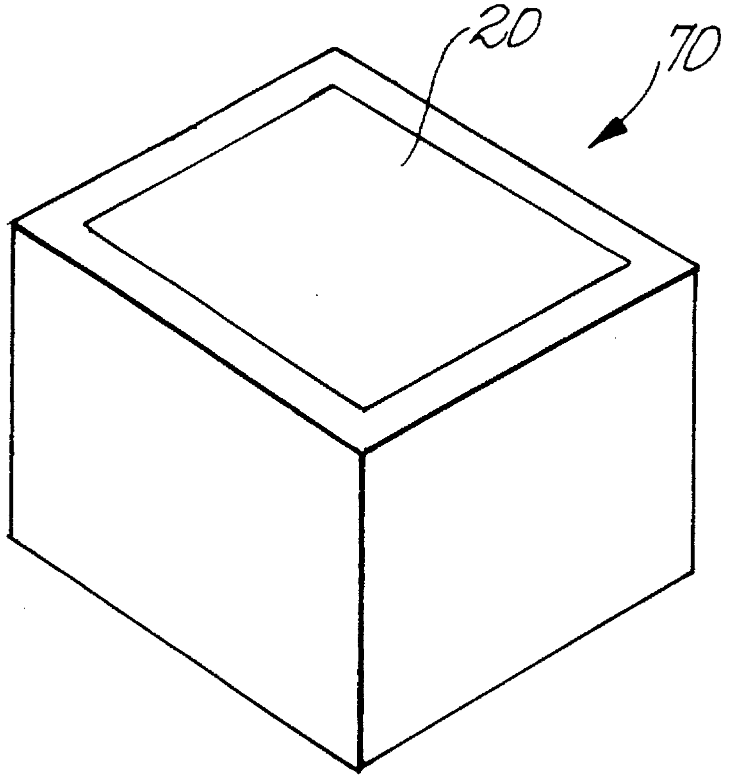
FIG. 7 is a prospective view of a third embodiment of an image converting apparatus comprising an image projector.

Referring to FIG. 2, the preferred embodiment of an image converting apparatus according to the present invention is shown to comprise a document contacting device 20 with a contact surface 21 for contacting a document 30, such as a transparent projector film with an image thereon, a photograph or a sheet of paper. When the image converting apparatus is an optical scanner 50 (see FIG. 5) or a photocopier 60 (see FIG. 6), the document contacting device 20 is made of transparent glass. When the image contacting apparatus is an image projector 70 (see FIG. 7), the contact surface 21 of the document contacting device 20 is a reflective surface.

The contact surface 21 of the document contacting device 20 is provided with a plurality of micro-particles 211 which have a distribution density greater than resolution of the image converting apparatus. Preferably, the distribution density is at least twice the resolution of the image converting apparatus. Thus, for optical scanners with resolutions ranging from 300 dpi (dots per inch) to 600 dpi, the distribution density should preferably be from 600 dpi to 1200 dpi.

Figure 3:
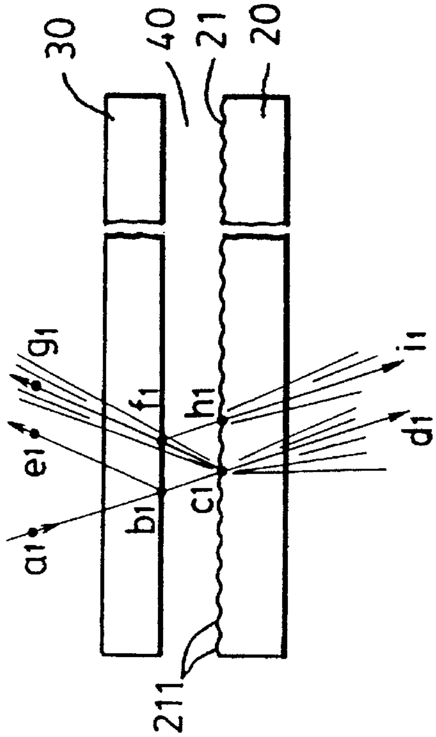
FIGS. 3 and 4 are side views which illustrate how thin-film interference is eliminated by the document contacting device of the preferred embodiment when in use.
Figure 4:
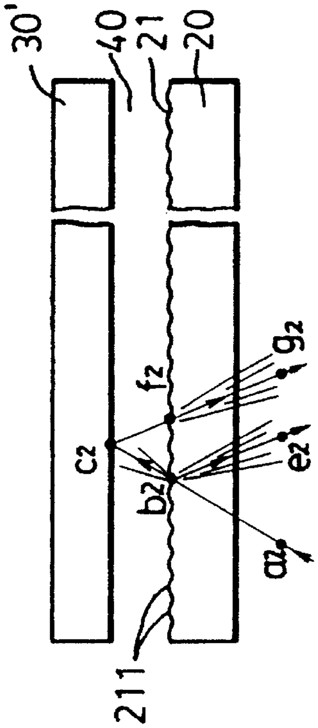
Figure 1:
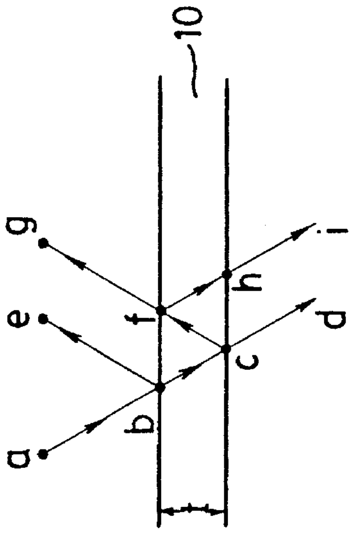
FIG. 1 illustrates the effects of thin-film interference.

Referring to FIG. 3, when the document 30 is made to contact the contact surface 21 of the document contacting device 20, a thin layer 40 of air is usually present between the document 30 and the contact surface 211. If the document 30 is a transparent projector film, a light beam (a1) passing through the document 30 and the thin air layer 40 is diffused by the micro-particles 211, thereby generating two diffused penetrating light beams, (c1d1) and (c1f1h1i1), and a diffused reflected light beam (b1c1f1g1). Referring to FIG. 4, if the document contacting device 20 is made of transparent glass and a light beam (a2) passes through the document contacting device 20 and the thin air layer 40 before striking the document 30', such as a photograph, two diffused reflected light beams, (a2b2e2) and (a2b2c2f2g2), are generated.

Thin film interference can thus be eliminated due to the light diffusing effect of the micro-particles 211 on the contact surface 21 of the document contacting device 20 of the image converting apparatus of the present invention, thereby resulting in the generation of clearer images by the image converting apparatus and in minimizing the occurrence of lost lines. The objectives of the present invention are thus met.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An image converting apparatus comprising a document contacting device with a contact surface that is provided with a plurality of micro-particles which have a light diffusing effect and a distribution density greater than a resolution of the image converting apparatus.

2. The image converting apparatus as claimed in claim 1, wherein said image converting apparatus is an optical scanner and said document contacting device is made of transparent glass.

3. The image converting apparatus as claimed in claim 1, wherein said image converting apparatus is a photocopier and said document contacting device is made of transparent glass.

4. The image converting apparatus as claimed in claim 1, wherein said image converting apparatus is an image projector and said contact surface is a reflective surface.

5. The image converting apparatus as claimed in claim 1, wherein said distribution density is at least twice the resolution of the image converting apparatus.

6. A method for eliminating thin-film interference in an image converting apparatus, comprising the step of providing a contact surface of a document contacting device of the image converting apparatus with a plurality of micro-particles that have a light diffusing effect and a distribution density greater than a resolution of the image converting apparatus.

7. The method as claimed in claim 6, wherein the image converting apparatus is an optical scanner and the document contacting device is made of transparent glass.

8. The method as claimed in claim 6, wherein the image converting apparatus is a photocopier and the document contacting device is made of transparent glass.

9. The method as claimed in claim 6, wherein the image converting apparatus is an image projector and the contact surface is a reflective surface.

10. The method as claimed in claim 6, wherein the distribution density is at least twice the resolution of the image converting apparatus.

* * * * *